United States Patent [19]
Ezekiel

[11] 3,821,295
[45] June 28, 1974

[54] PROCESS FOR THE PRODUCTION OF α-AMINO-ACID HYDROHALIDES

[75] Inventor: Aaron David Ezekiel, Ilford, England

[73] Assignee: Ilford Limited, Essex, England

[22] Filed: Sept. 13, 1973

[21] Appl. No.: 396,775

Related U.S. Application Data

[63] Continuation-in-part of Ser. No. 241,067, April 4, 1972, abandoned.

[30] Foreign Application Priority Data
Apr. 19, 1971  Great Britain........................ 9813/71

[52] U.S. Cl............................ 260/534 S, 260/402.5
[51] Int. Cl............................................. C07c 149/24
[58] Field of Search........................... 260/534, 402.5

[56] References Cited
UNITED STATES PATENTS

| | | | |
|---|---|---|---|
| 2,437,719 | 3/1948 | Walf et al. ...................... | 260/534 S |
| 2,460,785 | 2/1949 | Pierson et al. .................. | 260/534 S |
| 2,501,455 | 3/1950 | Stekal ............................ | 260/534 S |
| 2,900,375 | 8/1959 | Amiard et al. .................. | 260/534 S |
| 3,444,222 | 5/1969 | Roberts .......................... | 260/534 S |

Primary Examiner—Vivian Garner
Attorney, Agent, or Firm—Wenderoth, Lind & Ponack

[57] ABSTRACT

A process for the production of an α-amino-acid hydrohalide of the formula

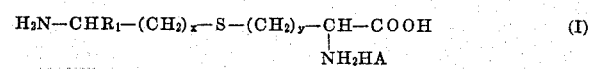 (I)

wherein $R_1$ is a hydrogen atom or a methyl or ethyl group, A is Cl, Br or I, $x$ is 0, 1 or 2 and $y$ is an integer from 1 to 6 is described. A compound of the formula

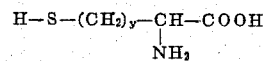

or a hydrohalide salt thereof is reacted with a hydrohalide of a compound of the formula

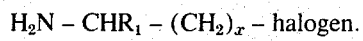

The reactants are brought together in an aqueous alkaline medium. The mixture is then acidified, a water-miscible organic solvent is added, the inorganic by-products are filtered off, an organic base is added and the compound of formula I is separated.

10 Claims, No Drawings

PROCESS FOR THE PRODUCTION OF α-AMINO-ACID HYDROHALIDES

This is a continuation in part of my prior U.S. Pat. application Ser. No. 241,067, filed Apr. 4, 1972 now abandoned.

According to the present invention there is provided a process for the production of an α-amino-acid hydrohalide of the formula

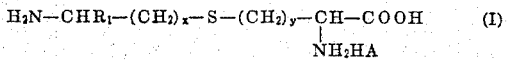
(I)

where $R_1$ is a hydrogen atom or a methyl or ethyl group, A is Cl, Br or I, $x$ is 0, 1 or 2 and $y$ is an integer from 1 to 6 which comprises reacting at a temperature ranging from 10 to 70° C, preferably from 15° to 25° C, in an aqueous alkaline medium a compound of the formula

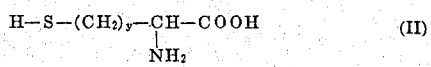
(II)

or the hydrohalide salt thereof of the formula

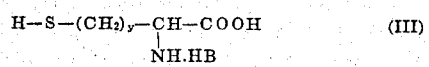
(III)

with a compound of the formula

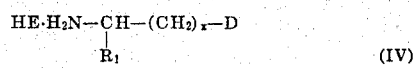
(IV)

wherein in the above formulae II-IV $R_1$, $x$ and $y$ have the meanings assigned to them above and B, D and E are each selected from Cl, Br and I, in the presence of a strong inorganic base, acidifying the reaction mixture with an acid HG where G is selected from Cl, Br and I to reduce the pH of the aqueous medium to below 1, adding sufficient water-miscible organic solvent to produce a liquid medium containing 75 – 95 percent by volume of the organic solvent, filtering off the inorganic precipitate caused by the addition of the organic solvent, adding to the filtrate sufficient organic base to raise the pH of the liquid to 4.5–9 and separating off the solid compound of formula I.

The preferred compounds of formula IV for use in the process of the present invention are those wherein both D and E are Br.

It is preferred that the compound of formula II or III is reacted with the compound of formula IV in an aqueous alkali medium in an inert gas atmosphere, preferably in a nitrogen atmosphere, obtained by bubbling the inert gas through the reaction mixture. The reaction medium is preferably rendered alkaline by means of an alkali metal hydroxide or an alkaline earth metal hydroxide. Especially suitable are the following strong inorganic bases: Sodium hydroxide, potassium hydroxide, lithium hydroxide, calcium hydroxide, magnesium hydroxide.

The preferred acid HG for use in acidifying the reaction mixture to a pH below 1 is HCl.

To precipitate the inorganic residue any inert organic solvent which is miscible with water in any proportion can be used but preferably alkanols or dialkyl ketones are used e.g. methanol, ethanol or propanol, ethanol or acetone being the preferred ones. The preferred form of ethanol is an ethanol of at least 90 percent, particularly industrial grade ethyl alcohol (which is also known as industrial methylated spirit) which is approximately 96 percent ethanol by volume. A particular advantage of the process of the present invention compared with previously known methods is that a very cheap solvent, industrial grade ethyl alcohol may be employed.

To raise the pH of the reaction medium to a value ranging from 4.5 to 9 a sufficient quantity of an organic base is added, for example methylamine, mono- or diethanolamine. Triethylamine, isopropylamine, n-propylamine, tertiary butylamine, n-butylamine and cyclohexylamine are the preferred organic bases. Piperidine is the most preferred base.

A particular advantage of the process of the present invention is that the inorganic residue readily precipitates from the very acid medium when the organic solvent is added. The supernatant containing the amino acid may easily be separated from the precipitate by filtration. In one of the prior art processes elution through a column containing ion exchange resin is required to remove traces of the inorganic matter and hydrohalide salts but if this process had ever been carried out on a commercial scale a very large column of resin would have been required.

The most useful compound of formula I is the hydrohalide salt of S-2-aminoethyl-L-cysteine and a preferred embodiment of the invention wherein this compound is produced comprises reacting L-cysteine hydrochloride with 2-bromoethylamine hydrobromide in the presence of a strong aqueous solution of potassium hydroxide, nitrogen being bubbled through the reaction mixture, acidifying the reaction mixture with HCl to reduce the pH to below 1, adding sufficient ethanol, preferably industrial grade ethyl alcohol, to produce a liquid medium containing 76–86 percent ethanol by volume, filtering off the inorganic precipitate, adding to the filtrate sufficient piperidine to raise the pH of the liquid to 4.5–9 and filtering the S-2-aminoethyl-L-cysteine hydrohalide.

By this embodiment of the present invention a S-2-aminoethyl-L-cysteine hydrochloride is obtained which also contains some hydrobromide. This will be the case in the process of the present invention whenever different halides are present initially or are added. The predominant salt will however always be the salt of the acid HG. For most uses the compounds of formula I may be used as the mixed hydrohalide salts but for some purposes and in particular when these compounds are to be used as additives for photographic silver halide emulsions it is preferred that they are in the form of the hydrochloride salt alone.

Thus according to another aspect of the present invention there is provided a process for the production of a compound of the above formula I where A is Cl which process comprises preparing the mixed salt hydrohalide compound of formula I by the process hereinbefore set forth, dissolving the compound in aqueous inorganic alkali solution, adding sufficient water-miscible organic solvent to produce a liquid medium containing 80 – 90 percent by volume of organic solvent, filtering off the inorganic precipitate, acidifying the filtrate with HCl to reduce the pH to below 1, adding if required sufficient water-miscible organic solvent to produce a liquid medium containing 80 – 90 percent organic solvent, filtering off the inorganic precipitate, adding sufficient organic base to produce a pH of 6 in the medium and collecting the hydrochloride salt of formula I. If some halide other than chlorine is still present in the product then this further process may be repeated until no other halide is present. The product may be recrystallized from 80–95 percent ethanol.

In this aspect of the invention it is preferred that the water miscible organic solvent is industrial grade ethyl alcohol and that the organic base is piperidine.

The α-amino-acid hydrohalides prepared by the process of the present invention are all of use as additives to photographic silver halide emulsions to reduce the tendency of the photographic material to exhibit latent image regression. They are usually added to photographic emulsions in amount which range from 0.05 – 1.0 g per g mole of silver present in the emulsion.

EXAMPLE 1

Nitrogen was bubled through a stirred solution of L-cysteine hydrochloride monohydrate (185.6 g, 1.05 mole) in distilled water for 10 minutes. Whilst maintaining a flow of nitrogen, a solution of potassium hydroxide (189 g, 3.37 moles) in water (300 ml) was added. The solution was heated on a water bath at 60° C and treated with powdered 2-bromoethylamine hydrobromide [22.5 g, 1.07 moles, added portion wise] over a period of 10 minutes.

The mixture was cooled immediately in an ice-bath (10° C) and was cautiously acidified with concentrated hydrochloric acid (Sp. Gr. 1,28, 235 ml) so that the temperature did not exceed 15° C (pH below 1.0). The acidic solution was poured into industrial grade ethyl alcohol (2000 ml) where a solid precipitated. More industrial grade ethyl alcohol spirit (1400 ml) was added to this solution which was stirred with a stirring rod for 1 minute and the mixture was refrigerated for 2 hours. The inorganic precipitate was filtered off and was washed with industrial grade ethyl alcohol (3200 ml). The combined filtrates were refrigerated for 0.75 hour when more inorganic precipitate deposited which was removed by filtration.

The filtrate was cooled in an ice-bath, stirred vigorously and cautiously neutralised with piperidine (177 ml) to pH 5.2–5.3. A turbid solution depositing crystals of the hydrochloride/hydrobromide of S-2-aminoethyl-L-cysteine was obtained. The colourless product was collected, washed with industrial grade ethyl alcohol (2000 ml) and dried at 50° C, m.p. 197°–199° (decomp.). Yield 184 g. Elemental analysis indicated that this product consists of the hydrochloride and hydrobromide in a ratio of 3:1 respectively. On this basis the overall yield was approximately 82 percent.

The S-2-aminoethyl-L-cysteine hydrochloride/hydrobromide (100 g) as just prepared was dissolved in a solution of potassium hydroxide, (56 g) in distilled water (200 ml) at room temperature and the aqueous solution was treated with industrial grade ethyl alcohol (1800 ml) when crystals of potassium chloride/Bromide were obtained. The inorganic precipitate was filtered off, washed with industrial grade ethyl alcohol (2 × 125 ml) and the combined filtrates were acidified with concentrated hydrochloride acid (Sp. Gr. 1.18, 130 ml). Initially a white gelatinous solid precipitated which dissolved on completion of the addition of the acid although the inorganic precipitate (KCl) remained insoluble. The solution was refrigerated for 1 hour (temp. 14° C) and the potassium chloride was filtered off and washed with industrial grade ethyl alcohol (2 a 40 ml).

The filtrate was vigorously stirred and neutralised cautiously with piperidine (62 ml) to a pH of 6.0. The colourless crystals of the hydrochloride were filtered off, washed with industrial grade ethyl alcohol (2 × 300 ml) and then with diethyl ether (100 ml) and dried 55° C. Yield 87.5 g m.p. 201°– 201.5° (decomp.).

If the entire hydrochloride/hydrobromide mixture (184 g) had been converted into the hydrochloride an overall yield of 161 g (76 percent) would have been obtained.

EXAMPLE 2

S-2-Aminoethyl-L-cysteine hydrochloride/hydrobromide

Nitrogen was slowly bubbled through a magnetically stirred solution of L-cysteine hydrochloride monohydrate (185 g) and bromoethylamine hydrobromide (220 g) in water (300 ml). Whilst maintaining the flow of nitrogen the stirred solution was cooled in a water-bath [18°–21° C] and treated with an aqueous solution of sodium hydroxide (50 percent wt./vol., 240 ml ≡ 120 g NaOH, added dropwise) over a period of 3.3 hours. When the addition of alkali was complete, the solution was stirred at 18°–21° C for a further period of 0.75 hour and the cooled solution was cautiously acidified to pH 1.0 with concentrated hydrochloric acid (110 ml., Sp. Gr. 1.18); care being taken that the temperature did not exceed 21° C. Cold industrial grade ethyl alcohol (3200 ml, 0° C) was poured into the aqueous acidic solution whereupon crystals of the alkali halide separated which were collected by filtration. The solid was washed with spirit (200 ml).

The combined filtrate was vigorously stirred and cautiously basified with piperidine (52 ml) to pH 7.9 when a fluffy white solid separated which was collected and washed with spirit. The solid on drying (40° C) weighed 128.8 g (58 percent).

For preparing the pure hydrochloride derivative of this compound, the following procedure was adopted.

A magnetically stirred solution of potassium hydroxide (8 g) in water (40 ml) was cooled to 20° C and treated with S-2-aminoethyl-L-cysteine hydrochloride/hydrobromide (20 g). The clear solution was stirred and treated with industrial methylated spirit (360 ml) whereupon crystals of the alkali halide deposited which were collected by filtration and washed with industrial methylated spirit (2 × 20 ml).

The combined filtrate and washings were cooled (0° C) stirred vigorously and then acidified with concentrated hydrochloric acid (35 ml, Sp. Gr. 1.18) to pH 1.0. The crystals of the alkali halide were collected, washed with industrial methylated spirit (2 × 10 ml) and the solid was discarded.

The filtrate and washings were cooled (5° C), vigorously stirred and cautiously basified with piperidine (20 ml) to an apparent pH 8.2 whereupon crystals of the pure hydrochloride derivative deposited. The solid was filtered off, washed well with industrial methylated spirit (120 ml) and dried at 40° C. Yield 15.0 g m.p. 205°–206° (decomp.).

The product was identical to an analytically pure sample of the same compound obtained from a pure chemical suppliers in melting point, mixed m.p., infrared spectroscopy and paper chromatographic analysis.

EXAMPLE 3

S-3-Amino-n-propylcysteine hydrochloride/hydrobromide

A slow stream of nitrogen was bubbled through a magnetically stirred solution of L-cysteine hydrochloride monohydrate (18.56 g) and 1-bromo-3-propylamine hydrobromide (23.5 g) in water (40 ml). Whilst maintaining this flow of nitrogen, the stirred solution was cooled in an ice bath and treated with an aqueous solution of sodium hydroxide (50 percent wt./vol., 24 ml = 12 g NaOH). The alkali was added dropwise over a period of 0.5 hour care being taken that the temperature of the reaction mixture did not exceed 20° C. After the addition of sodium hydroxide was complete, the solution was stirred for a further period of 0.5 hour, cooled to 10° C and cautiously acidified with concentrated hydrochloric acid (15 ml, Sp. Gr. 1.18) to pH 1.0. The aqueous acidic solution was poured into cold industrial methylated spirit (380 ml) stirred vigorously allowed to stand for 0.5 hour and the crystals of the alkali halide were collected and washed with spirit (20 ml).

The combined filtrate was cooled and vigorously stirred. The solution was cautiously basified with piperidine (8 ml) to an apparent pH 7.8 whereupon a solid was obtained which was collected and washed with spirit (100 ml). After drying at 40° C the solid weighed 20.0 g m.p. 202° – 203° (decomp.).

S-3-Amino-n-propylcysteine hydrochloride

The foregoing hydrohalide mixture (16 g) was dissolved in a solution of potassium hydroxide (8.96 g) in water (32 ml) and the cooled solution was stirred, diluted with cold (0° C) industrial methylated spirit (288 ml). The inorganic matter was filtered off, washed with spirit (2 × 15 ml) and the combined filtrate was stirred and acidified with concentrated hydrochloric acid (20.8 ml, Sp. Gr. 1.18) to an apparent pH 1.0. The alkali halides were filtered off and washed with spirit (2 × 10 ml).

The filtrate was stirred vigorously, cooled and basified with piperidine (9.8 ml) to pH 8.2 whereupon a solid was obtained which was collected washed with spirit (2 × 50 ml) and dried at 40° C. Yield 12.0 g m.p. 206° – 207° C, elemental analysis indicated the presence of a trace of bromine (2 percent).

Consequently the entire product (12 g) was again subjected to a similar treatment using the appropriate amounts of KOH (6.72 g) and hydrochloric acid (15.6 ml). After basifying the acidic filtrate with piperidine to an apparent pH of 8.1 the pure hydrochloride was obtained which was filtered off, washed with industrial grade ethyl alcohol and dried. Yield 9.8 g m.p. 212° – 213° C. Found: 33.5 C, 7.2 H, 15.1 S, 16.7 Cl $C_{16}H_{15}ClN_2O_2S_2$ requires 33.6 C, 7.1 H, 14.9 S, 16.5 percent Cl.

I claim:

1. A process for the production of an α-amino-acid hydrohalide of the formula

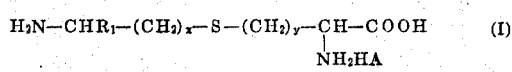

where $R_1$ is a hydrogen atom or a methyl or ethyl group, A is Cl, Br or I, $x$ is 0, 1 or 2 and $y$ is an integer from 1 to 6, which comprises reacting at a temperature ranging from 10 to 70° C in an aqueous alkaline medium a compound of the formula

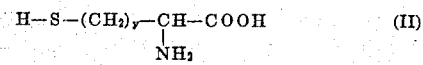

or the hydrohalide salt thereof of the formula

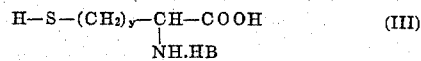

with a compound of the formula

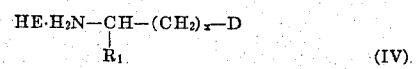

wherein in the above formulae II-IV $R_1$, $R_2$, $x$ and $y$ have the meanings assigned to them in regard to formula I and B, D and E are each selected from Cl, Br and I, in the presence of a strong inorganic base, acidifying the reaction mixture with an acid HG where G is selected from Cl, Br and I to reduce the pH of the aqueous medium to below 1, adding sufficient water-miscible organic solvent to produce a liquid medium containing 75 – 95 percent by volume of the organic solvent, filtering off the inorganic precipitate caused by the addition of the organic solvent, adding to the filtrate sufficient organic base to raise the pH of the liquid to 4.5–9 and separating off the solid compound of formula I.

2. A process according to claim 1 which comprises reacting a compound of formula II or III with a compound of formula IV in an inert gas atmosphere.

3. A process according to claim 2 which comprises using nitrogen as inert gas.

4. A process according to claim 2 which comprises using a compound of formula IV wherein both D and E are bromine atoms.

5. A process according to claim 4 which comprises using ethanol as the water-miscible organic solvent.

6. A process according to claim 1 which comprises using a strong inorganic base selected from the group consisting of alkali metal hydroxides and alkaline earth metal hydroxides.

7. A process according to claim 1 which comprises using a water-miscible organic solvent selected from the group consisting of water-miscible alkanols and water-miscible dialkyl ketones.

8. A process according to claim 1 which comprises using an organic base selected from the group consisting of piperidine, triethylamine, isopropylamine, n-propylamine, tertiary butylamine, cyclohexylamine, mono- or diethanolamine and methylamine.

9. A process according to claim 8 for the production of a S-2-aminoethyl-L-cysteine hydrohalide which comprises reacting L-cysteine hydrochloride with 2-bromoethylamine hydrobromide in the presence of a strong aqueous solution of potassium hydroxide, bubbling nitrogen through the reaction mixture, acidifying the reaction mixture with HCl to reduce the pH thereof to below 1, adding sufficient ethanol to produce a liquid medium containing 76 – 86 percent ethanol by volume, filtering off the inorganic precipitate, adding to the filtrate sufficient piperidine to raise the pH of the liquid to 4.5 – 9 and filtering off the S-2-aminoethyl-L-cysteine hydrohalide.

10. A process according to claim 1 for the production of a compound of formula I wherein A is Cl which comprises dissolving a compound of formula I wherein A is different from Cl in an aqueous inorganic alkali solution, adding sufficient water-miscible organic solvent to produce a liquid medium containing 80 – 90 percent by volume of organic solvent, filtering off the precipitated inorganic matter acidifying the filtrate with HCl to reduce the pH to below 1, adding the quantity of a water-miscible organic solvent which is sufficient to produce a liquid medium containing 80 – 95 percent organic solvent, filtering off the inorganic matter, adding sufficient organic base to produce a pH of 6 in the medium and collecting the hydrochloride salt of formula I.

* * * * *